J. H. MINER.
INSERTIBLE SAW TOOTH.
APPLICATION FILED OCT. 5, 1908.

926,675.

Patented June 29, 1909.

Attest.
Bent. M. Stahl.
Edw. L. Tolson.

Inventor.
James H. Miner.
by Spear, Middleton, Donaldson & Spear
Atty's.

UNITED STATES PATENT OFFICE.

JAMES H. MINER, OF LUMBERTON, MISSISSIPPI.

INSERTIBLE SAW-TOOTH.

No. 926,675.   Specification of Letters Patent.   Patented June 29, 1909.

Application filed October 5, 1908.   Serial No. 456,280.

*To all whom it may concern:*

Be it known that I, JAMES H. MINER, citizen of the United States, residing at Lumberton, Mississippi, have invented certain new and useful Improvements in Insertible Saw-Teeth, of which the following is a specification.

My invention relates to improvements in insertible saw teeth, and the object of the invention is to provide means by which the saw tooth may be readily inserted and firmly held and tightened from time to time, as may be required to compensate for any loosening which takes place due to working strains.

The invention includes the novel features of construction and combination and arrangement of parts hereinafter described and particularly set forth in the appended claims.

Figure 1:
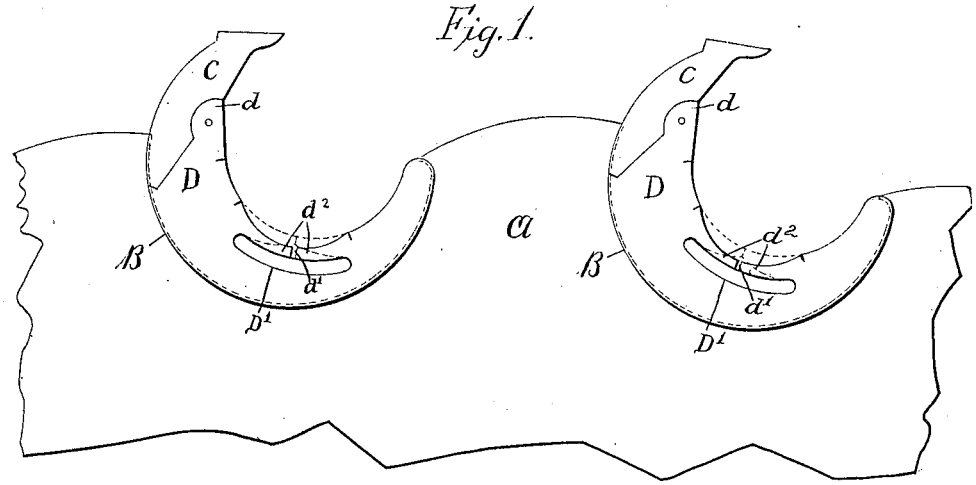
Figure 2:
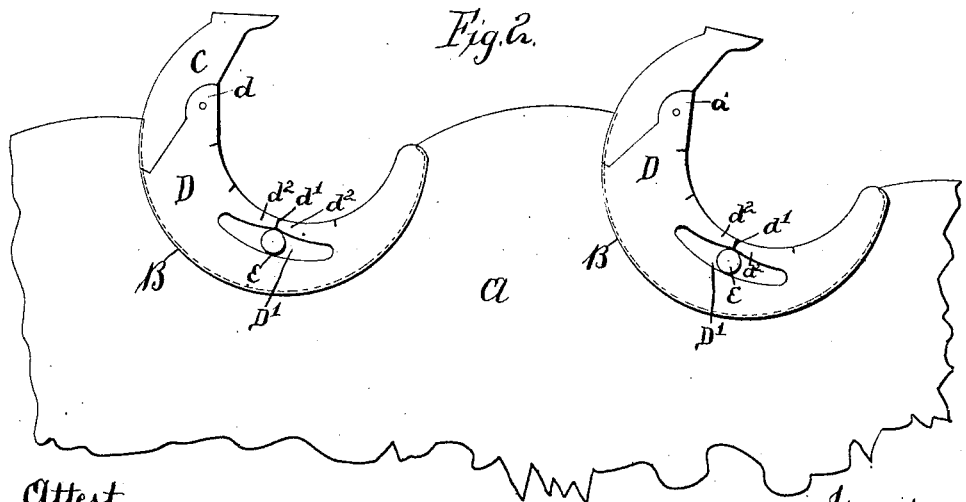

In the accompanying drawings I have shown a portion of a saw with a tooth secured therein according to my invention, Figure 1 of this drawing being a face view showing in full lines the tooth and its holder in the shape in which they would be first applied to the saw, and Fig. 2 is a similar view showing how the holder would be expanded to tighten the grip upon the tooth after it has been loosened up by wear or working strains.

Referring by reference characters to this drawing, A represents the saw plate which is provided with the suitably spaced semicircular recesses B to receive the teeth and their holders. The teeth are shown at C and are of the ordinary construction.

D represents the improved holder which is of approximately crescent shape having at one end a suitably curved projection $d$, which fits into a corresponding recess in the shank of the tooth for holding the same. The holder D is provided with an elongated recess or opening $D'$, and a cut or slot $d'$ is made completely through the center of the narrow web or wall $d^2$ dividing this into two portions. The holder D is made to have a certain amount of spring or elasticity, as shown by several slits cut in the inner circle, which allows for compression of the inner circle of the holder, giving it more spring and is so shaped that when it and the tooth are applied to the proper position in the socket or recess in the saw plate, the tooth will be firmly held therein by the holder.

As the holder is bound to loosen after a time, due to wear and working strains, I have found it desirable to provide a simple and efficient means for tightening it without making use of a new holder and the elongated recess and slot or cut through the side wall accomplishes this in a most simple and expeditious manner, as it is only necessary to insert in the elongated opening D a suitable wedge shaped tool, such as indicated at E which may be driven in to force the portions $D^2$ on each side of the cut outwardly. The relation of these parts is such that the forcing of them outwardly by the tool produces the same action as the straightening of a toggle joint, and thus a powerful pressure is exerted tending to force the ends of the crescent apart and thus to wedge the saw tooth C firmly in place. The expanded position of the parts is shown in full lines in Fig. 2 and in dotted lines in Fig. 1.

It will be readily seen that the foregoing operation may be repeated as often as necessary, and thus the tooth always maintained rigidly connected with the saw, so long as desired, in the most simple and expeditious manner.

Having thus described my invention what I claim is:—

1. In combination a recessed saw plate or blade, a tooth carried thereby, and a crescent shaped holder for clamping said tooth in the recess, having an elongated curved opening in proximity to the concave side of said holder, the portion of the holder between said opening and the concave wall being divided at a point approximately opposite the center of the opening, substantially as described.

2. In combination a recessed saw plate or blade, a tooth carried thereby, and a crescent shaped holder for clamping said tooth in the recess, having an elongated curved opening in proximity to the concave side of said holder, the portion of the holder between said opening and the concave wall being divided at a point approximately opposite the center of the opening, said holder being also provided with a series of slits leading inward from the concave edge, substantially as described.

In testimony whereof, I affix my signature in presence of witnesses.

JAMES H. MINER.

Witnesses:
 J. B. SALMOND,
 L. C. PIGFORD,
 L. L. BREWER.